United States Patent [19]

Horner et al.

[11] 4,359,259
[45] Nov. 16, 1982

[54] HOLOGRAPHIC MULTIPLEXER/DEMULTIPLEXER

[75] Inventors: Joseph L. Horner, Cambridge; Jacques E. Ludman, Westford, both of Mass.

[73] Assignee: The United States of America as represented by the Secretary of the Air Force, Washington, D.C.

[21] Appl. No.: 144,819

[22] Filed: Apr. 29, 1980

[51] Int. Cl.$^3$ ............................ G02B 5/32; H04B 9/00
[52] U.S. Cl. ........................................ 350/3.7; 370/3
[58] Field of Search ............... 350/3.7, 3.73, 96.16, 350/96.19; 370/3

[56] References Cited

U.S. PATENT DOCUMENTS

| | | | |
|---|---|---|---|
| 3,633,035 | 1/1972 | Uchida | 250/199 |
| 4,062,618 | 12/1977 | Steensma | 350/3.5 |
| 4,155,628 | 5/1979 | Schlossberg | 350/174 |
| 4,175,827 | 11/1979 | McMahon | 350/96.14 |
| 4,198,117 | 4/1980 | Kobayashi | 350/96.19 |
| 4,296,994 | 10/1981 | Quick et al. | 350/3.73 |

OTHER PUBLICATIONS

Thomlinson, W. J., "Wavelength Multiplexing in Multimode Optical Fibers", *Applied Optics*, vol. 16, No. 8, pp. 2180–2194, Aug. 1977.
Aoyama et al., "Low-Loss Optical Demultiplexer for WDM Systems in the 0.8 μm Wavelength Region," *Applied Optics*, vol. 18, No. 16, pp. 2834–2836, Aug. 1979.
Kogelnik, H., "Coupled Wave Theory for Thick Hologram Gratings" Bell System Technical Journal, vol. 48, No. 9, pp. 2909–2947, Nov. 1969.
Sincerbox, G. T., "Formation of Optical Elements by Holography", vol. 10, No. 3, IBM Tech. Disclosure Bulletin, pp. 267–268, Aug. 1967.
Nishihara H., et al., "Holdcoupler: A Novel Coupler for Optical Circuits," *IEEE Jour. Of Quantum Electronics*, Sep. 1975, pp. 794–796.

*Primary Examiner*—Bruce Y. Arnold
*Attorney, Agent, or Firm*—Donald J. Singer; Jacob N. Erlich

[57] ABSTRACT

A multiplexer/demultiplexer having a holographic element made using a single exposure of a photosensitive medium incorporated therein. In operation as a demultiplexer a single signal having a plurality of wavelengths impinges upon the holographic element in an appropriate manner and is separated into a plurality of signals, each being of a different one of the wavelengths. In the multiplexing mode of operation, a plurality of signals, each being of a different wavelength impinges upon the holographic element in an appropriate manner and emerges therefrom as a single signal having all of said different wavelengths.

15 Claims, 6 Drawing Figures

HOLOGRAPHIC MULTIPLEXER/DEMULTIPLEXER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a multiplexing system, and, more particularly, to a multiplexer/demultiplexer which incorporates therein a holographic element.

The need frequently arises for communications or reconnaissance systems which simultaneously convey multiple messages from a large number of information sources in one location to a large number of users at another location. Multiplexing systems economically meet this need by combining the messages from several information sources, which are then transmitted as a composite group over a single transmission facility, with provision at the receiver for separation (demultiplexing) back to the individual messages. Since only one transmission facility is needed instead of many, one advantage of multichannel operation is a lessening of the total quantity of necessary equipment. Each of the individual streams of information that form a multiplexed group are often denoted as a channel.

There are generally two generic forms of multiplexing systems. These are wavelength or frequency division multiplexing and time division multiplexing. Frequency division multiplexing is directly applicable to continuous wave form (analog) sources, in essence involving stacking side by side in frequency several information channels so as to form a composite signal. The composite frequency-multiplexed signal is then used to modulate a carrier in some conventional manner. Recovery of the individual messages after reception and demodulation is accomplished by bandpass filtering and frequency selection of the channels.

Time division multiplexing is a logical extension of pulse modulation and involves interleaving in time the narrow pulses of several ordinary pulse modulation signals and thus form one composite pulse transmission system. Separation of the time multiplexed pulse streams at the receiver is accomplished by gating appropriate pulses into individual channel filters.

A third technique, phase multiplexing, is possible but appears less practical than either frequency division multiplexing or time division multiplexing.

In recent years with the development and implementation of fiber optic technology into practical transmission systems a great deal of attention has been given to the multiple carrier technique referred to as wavelength division multiplexing (WDM). This technique, which is the optical equivalent of frequency division multiplexing techniques employed in RF coaxial transmission networks, can be used to increase the information transfer capacity of the medium. In the wavelength division multiplexing technique each discrete data channel is modulated onto an optical carrier of a fixed wavelength. Each of the individual carriers are then superimposed onto the optical transmission medium. At the optical receiver the individual carriers must be reestablished by separating the composite carrier into its individual wavelength components.

One of the parameters that encourages the development of wavelength division multiplexing is the inherent narrow spectral characteristics of optical sources and the relatively wide spectral bandwidth of an optical fiber. To achieve the desired optical separation and make wavelength division multiplexing practical, a series of optical techniques have been examined. Some of these techniques employ prisms, blazed plane reflection gratings, simple thick reflection gratings, multiple thick reflection gratings, simple thick transmission gratings and dichromatic coatings.

Unfortunately, size and expense are critical factors when providing optical multiplexing systems. To date, however, multiplexing systems have been either unreliable in complete separation of the individual wavelength components or are of such size and cost so as to provide an overall system which is incompatible with the desired small size and economic requirements. Consequently, a need arises for a small, lightweight, inexpensive device which can be effectively used as both a multiplexer and demultiplexer and yet be compatible with the inherent narrow spectral characteristics of today's optical sources.

SUMMARY OF THE INVENTION

The instant invention overcomes the problems encountered in the past by providing a multiplexer/demultiplexer made up of a single component in the form of a holographic element and is therefore small, lightweight, and inexpensive to produce. In addition, the holographic multiplexer/demultiplexer of this invention can be made to operate directly with the diverging output of an optical fiber, performing the functions of collimating, wavelength separation and refocusing in a single element.

The multiplexer/demultiplexer of this invention incorporates therein a holographic element capable of operating in either transmission or reflection. This element is made by a holographic technique utilizing a photosensitive medium having a sufficient thickness so as to achieve a high diffraction efficiency as well as a broad bandwidth of operation. In addition, the photosensitive medium must be capable of high resolution in order to record the high density of optical fringes necessary for practical operation.

In fabricating the transmissive multiplexer/demultiplexer of this invention a pair of temporally and spatially coherent beams of electromagnetic radiation are made to interfere in the photosensitive medium. Preferably both beams are derived from the same source of electromagnetic radiation and form two separate paths of substantially identical length. One of the beams (a converging beam) is focused by conventional focusing apparatus through the photosensitive medium to a point located behind the photosensitive medium. The other beam (a diverging beam) emerges from an optical fiber or the like acting as a point source and impinges upon the side of the photosensitive medium opposite the focus point of the converging beam.

In fabricating the reflective version of this invention the diverging beam impinges upon the same side of the photosensitive medium as the focus point of the converging beams. This is accomplished by appropriate focusing means which direct the diverging beam into the same side of the photosensitive medium as the focus point of the converging beam. The above procedures for producing both the transmissive and reflective multiplexer/demultiplexer of this invention corresponds to the making of a hologram of a virtual point source. Thereafter, the photosensitive medium is developed by methods appropriate to the photosensitive medium in order to produce the holographic element.

In use as a demultiplexer, an electromagnetic signal or beam, containing a plurality of channels of slightly differing wavelengths is introduced into the holographic element from a point source having the same relative position with respect to the holographic element as the point source had to the photosensitive medium during the production of the holographic element. Within the holographic element of the multiplexer/demultiplexer of this invention, the individual channels or wavelengths are angularly separated, and directed each to a position located substantially along a line having the same relative position to the holographic element as a line drawn through the focus point of the converging beam and the point source of the diverging beam had with respect to the photosensitive medium utilized to make the holographic element. The spatially separated channels or wavelengths can be detected at these positions by a plurality of conventional detectors or be received directly by a series of optical fibers. When this invention operates as a multiplexer, the holographic element is utilized in a reverse procedure in which the device combines a plurality of optical channels or wavelengths into a single beam having all the channels or wavelengths.

It is therefore an object of this invention to provide a multiplexer/demultiplexer which is small, lightweight and extremely efficient in operation.

It is another object of this invention to provide a multiplexer/demultiplexer which is capable of operation with more than two closely spaced wavelengths.

It is a further object of this invention to provide a multiplexer/demultiplexer which is capable of operating with the diverging output of an optical fiber.

It is still another object of this invention to provide a multiplexer/demultiplexer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE DRAWING

DETAILED DESCRIPTION OF THE PREFERRED EMBODIMENTS

Figure 4:
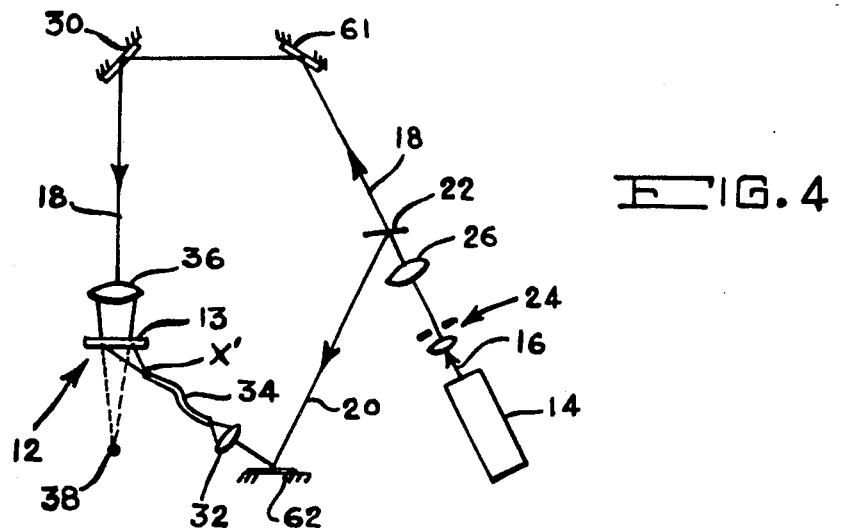
FIG. 4 is a schematic representation of a technique for producing another embodiment of the multiplexer/demultiplexer of this invention.
Figure 5:
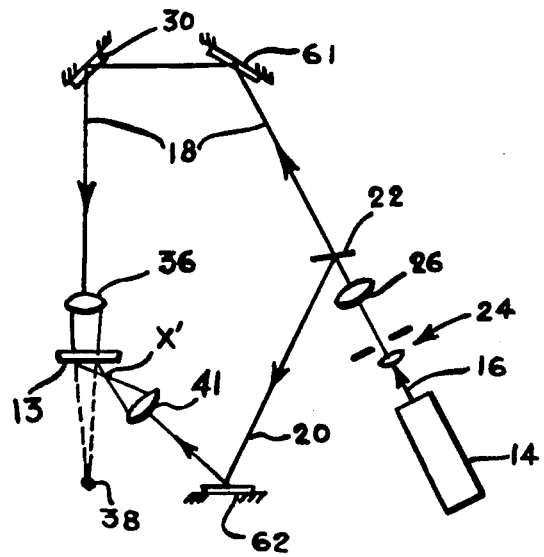
FIG. 5 is a schematic representation of another technique for producing the alternate embodiment of the multiplexer/demultiplexer of this invention.

In order to fully understand the embodiments of this invention, it is first necessary to describe the technique for producing the multiplexer/demultiplexer of this invention. Since this invention is divided into two types of multiplexer/demultiplexers, FIGS. 1 and 2 will be referred to for illustrating the fabrication procedure or technique of producing the transmissive multiplexer/demultiplexer 10 depicted in use in FIG. 3. FIGS. 4 and 5 of the drawing will be referred to for illustrating the technique of producing the reflective multiplexer/demultiplexer 12 depicted in use in FIG. 6 of the drawing. It should be noted, however, that even though the transmissive and reflective multiplexer/demultiplexer 10 and 12 respectively, form different embodiments of this invention, the techniques for producing and using both of the multiplexer/demultiplexers 10 and 12 are substantially similar. Therefore, for purposes of clarity, identical elements in all the Figures of the drawing will be referred to by the same reference numerals.

Figure 1:
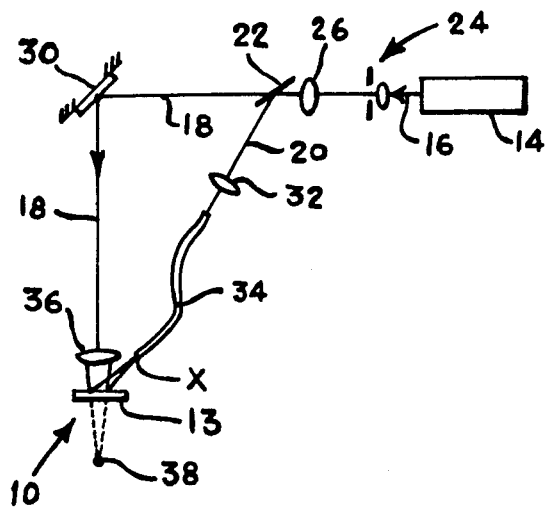
FIG. 1 is a schematic representation of a technique for producing the multiplexer/demultiplexer of this invention.

Reference is now made to FIG. 1 of the drawing in order to fully describe one of the techniques which may be utilized to produce the transmissive multiplexer/demultiplexer 10 of this invention. This procedure incorporates therein the utilization of a photosensitive medium 13 described more fully in detail hereinbelow and any conventional source of temporally and spatially coherent, monochromatic electromagnetic radiation 14. The source of electromagnetic radiation may be in the form of, for example, an argon laser.

Laser 14 produces a beam 16 of electromagnetic radiation. Beam 16 is divided into two portions or paths, hereinafter referred to as beams 18 and 20, by any conventional beam dividing means such as a conventional beam splitter 22. Spatial filtering of beam 16 may be accomplished by any conventional spacial filtering device, such as a lens-pinhole filter 24 while collimation of beam 16 may be achieved by any conventional collimating device such as lens 26. Additionally, in the method of fabricating transmissive multiplexer/demultiplexer 10 as illustrated in FIG. 1 of the drawing, the path lengths of beams 18 and 20 are made substantially equal to provide an interference between beams 18 and 20 within photosensitive medium 13. By so doing, the holographic element of the multiplexer/demultiplexer 10 of this invention, after subsequent photographic development, is produced.

Still referring to FIG. 1 of the drawing, photosensitive medium 13 can be in the form of, for example, a photographic emulsion having the appropriate characteristics, a photo resist film, a dichromated gelatin coating, or the like. The specific choice depends upon the properties needed for a specific application of this invention. Furthermore, photosensitive medium 13 is made of sufficient thickness to achieve a high diffraction efficiency (i.e., 80%) and yet not so thick that it will have too narrow a bandwidth of operation (i.e $\pm 15\%$ about the central wavelength). A focusing device such as lens 32 is provided to launch beam 20 into a conventional optical fiber 34. The substantially identical path lengths of beams 18 and 20 are achieved by the appropriate placing of any suitable directing element such as mirror 30 within the path of beam 18 and making optical fiber 34 of appropriate length within the path of beam 20.

Beam 20 emerges from the end, X, of fiber 34 which acts as a point source. As a divergent beam, beam 20 illuminates the photosensitive medium 13 which is selected to have a high sensitivity at the wavelength of the coherent source of radiation 14. The other beam 18 passes through a conventional converging device such as lens 36 which focuses beam 18 through medium 13 to a point 38 located on the opposite side of photosensitive medium 13 upon which beam 20 impinges.

The converging beam 18 and the diverging beam 20 meet and interfere in photosensitive medium 13, which, after appropriate development, bleaching or other processing, records the resultant fringe pattern as a refractive index or phase change in the medium. Judicious choice of an angular relationship between beams 18 and 20 assists in lowering reflection losses, while obtaining high dispersion and reasonable beam intensities throughout the interference region. The ratio of the two beam intensities would preferably be unity at the center of the pattern, although it varies by a factor of two across the interference region due to the oblique angle between fiber 34 and photosensitive medium 13. The use of identical path lengths for beams 18 and 20 insures both a high coherence between the two beams and a high modulation of the interference fringes.

Photosensitive medium 13 is exposed by beams 18 and 20. For example, using a dichromated gelatin film about 15$\mu$ meters in thickness as the photosensitive medium 13, an exposure of over 100 millijoules for beam 16 would yield maximum diffraction efficiency, although it should be realized that this procedure is not limited to a particular exposure. Generally, with reference to FIG. 3 or 6, diffraction efficiency is measured by dividing light intensity in focused spot 38 by the light intensity emerging at point X. The exposure time may also be adjusted to give the maximum possible diffraction efficiency. Subsequent development of photosensitive medium 13 produces holographic element 40 as illustrated in FIG. 3 of the drawing.

Figure 2:
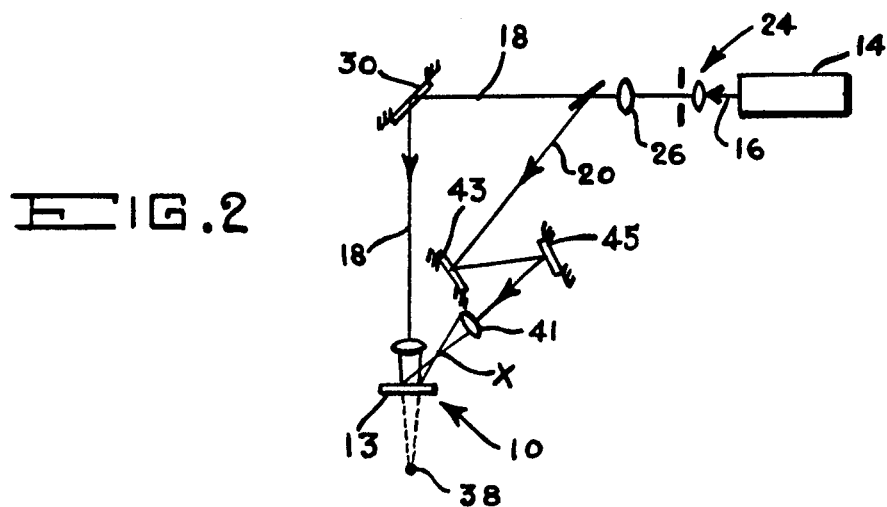
FIG. 2 is a schematic representation of another technique for producing the multiplexer/demultiplexer of this invention.

Before setting forth the actual operation of transmissive multiplexer/demultiplexer 10 of this invention, an alternate procedure for producing holographic element 40 is described hereinbelow. This procedure for making the transmissive multiplexer/demultiplexer 10 of this invention is best shown in FIG. 2 of the drawing. The procedure depicted in FIG. 2 is identical to the procedure set forth herinabove with respect to FIG. 1 except that the optical fiber 34 is replaced with an air path and an appropriate focusing device in the form of lens 41. In some instances, as shown in FIG. 2, additional beam directing elements, in the form of mirrors 43 and 45 may also be required. Lens 41 is arranged to focus the beam 20 at the same point in space, X, previously occupied by the end, X, of the optical fiber 34 shown in FIG. 1 of the drawing. In so doing, such a procedure enables point source X to simulate the output of a perfect optical fiber. Such a procedure is extremely desirable since if fiber 34, shown in FIG. 1 of the drawing, is one of the multimode types of fibers, the radiation emerging from fiber 34 is a speckle pattern with variations in amplitude and phase throughout the output pattern. Consequently, there are regions within photosensitive medium 13 in which no interference pattern is recorded. Such an effect detracts from the overall efficiency of the multiplexer/demultiplexer 10 of this invention since the output pattern changes from fiber to fiber, or, in some instances even within the same fiber if the fiber is flexed or bent.

The procedure set forth above and illustrated in FIG. 2 of the drawing obviates this problem and insures that an interference pattern is recorded over the full extent of the overlapping beams 18 and 20. Such a technique, as illustrated in FIG. 2 greatly improves the overall efficiency of this invention.

Figure 3:
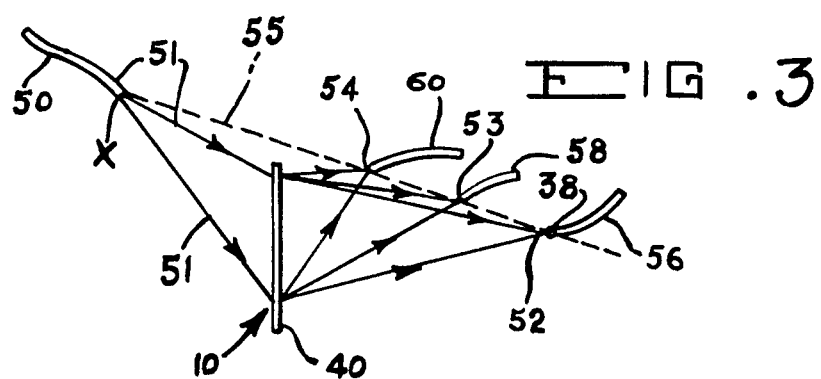
FIG. 3 is a schematic representation of the multiplexer/demultiplexer of this invention, shown in operation.

Reference is now made to FIG. 3 of the drawing which schematically depicts the operation of the transmissive multiplexer/demultiplexer 10 of this invention in which holographic element 40 has been fabricated by either the method described with respect to FIG. 1 or with respect to FIG. 2 of the drawing. In utilizing holographic element 40 as a demultiplexer, for example, a fiber 50 is positioned so as to have its end 51 located substantially at the same spot, X, relative to holographic element 40 as the relationship between point, X, and photosensitive medium 13 utilized in the preparation of multiplexer/demultiplexer 10 of this invention and depicted in FIGS. 1 and 2 of the drawing.

Still referring to FIG. 3, fiber 50 is coupled to a beam of electromagnetic radiation (not shown) having a plurality of wavelengths or wavelength division multiplexed signals. These signals in the form of beam 51 emerge from fiber 50. As a result of the holographic makeup of element 40 each of the different wavelength channels is focused to a different spot, illustrated by three such positions 52, 53 and 54 in FIG. 3. Positions 52, 53 and 54 are situated substantially along a line (illustrated by dotted line 55) having the same relative position with respect to holographic element 40 as a line drawn through focus point 38 of beam 18 and point X has with respect to photosensitive medium 13 described with reference to the making of holographic element 40.

Each channel is separated and focused by holographic element 40 to a separate position or point (52, 53, 54, for example) along line 55. The longer wavelength channels, due to their greater diffraction, focus to a point 54 closer to the holographic element 40, for example, then the shorter wavelength channel 52. The focused spots or positions 52, 53 and 54 of electromagnetic radiation of each channel can be directly coupled to an individual optical fiber 56, 58 and 60, respectively, or to small detectors (not shown), depending upon the application of this invention.

It should also be noted that although only three such points 52, 53 and 54 representative of three wavelengths are illustrated in the drawing, this invention is not limited to this particular number which is only used for purposes of illustration. In addition, the alignment of the input fiber 50 is only critical in that it must be within a few millimeters of spot X. It is also unnecessary to have a strictly coherent optical signal for efficient operation. Hence, power sources with limited coherence lengths such as laser diodes or light emitting diodes can be utilized as the source of electromagnetic radiation for the multiplexer/demultiplexer 10 of this invention.

Although FIG. 3 of the drawing is utilized to illustrate the demultiplexing operation of this invention, it can also be utilized to depict the multiplexing operation of this invention in which all beams would be propagating in the reverse direction. That is, the individual optical channels or wavelengths would emerge from fibers 56, 58 and 60, go through holographic element 40 and enter fiber 50 or a conventional detector (not shown) as a multiplexed signal. However, whether this device is used as a multiplexer or demultiplexer, either method (illustrated in FIG. 1 or 2) of preparing holographic element 40 can be utilized within the scope of this invention.

It is desirable in some instances to perform the multiplexing or demultiplexing operation in a limited amount of space. It is therefore necessary, within the scope of this invention, to fabricate the multiplexer/demultiplexer for operation in the reflective mode. Reference is therefore made to FIGS. 4 and 5 of the drawing which illustrate procedures of this invention for producing the reflective multiplexer/demultiplexer 12. It is again emphasized, that for ease of understanding this invention elements found in FIGS. 4-6 which are identical to the elements of FIGS. 1-3 will be given the same reference numerals. Only additional or different elements will be given different reference numerals.

FIG. 4 illustrates schematically an arrangement for fabricating the reflective multiplexer/demultiplexer 12 of this invention. Also, to avoid obvious redundancies, since the basic procedure and concept involved in the making of the reflective multiplexer/demultiplexer 12 of this invention is essentially the same as described hereinabove with reference to the fabrication of the transmissive multiplexer/demultiplexer 10 of this invention, detailed explanation of similar procedures and concepts will not be repeated.

The essential difference between the procedure utilized in the fabrication of the embodiment depicted in FIG. 1 and the procedure utilized in FIG. 4 of the drawing is the relocation of reflecting and focusing elements. For example, substantially 100% reflective mirrors 61 and 62 are provided in order to direct beam 18 to the front of and beam 20 around the back of, respectively, the photosensitive medium 13 so as to impinge upon the same side of photosensitive medium 13 as the focus point 38 of beam 18. Otherwise, the setup for the fabrication of the reflective multiplexer/demultiplexer 12 is identical to the setup depicted in FIG. 1 for the transmissive multiplexer/demultiplexer 10 of this invention. In multiplexer/demultiplexer 12 as with the multiplexer/demultiplexer 10 interference within photosensitive medium 13 takes place, in which the photosensitive medium 13 records the resultant fringe pattern as a refractive index or phase change in the medium. Also, similarly to the procedure set forth with respect to FIG. 1 the path lengths of beams 18 and 20 should be substantially equal and can be made so by the appropriate choice for the length of fiber 34. For purposes of clarity, however, the end of fiber 34 (the point source for beam 20) is designated as X' rather than X.

An alternate procedure for producing multiplexer/demultiplexer 12 is depicted with respect to FIG. 5 of the drawing. In this procedure, as with the procedure described with respect to FIG. 4 of the drawing, optical fiber 34 is replaced by an air path and a focusing lens 41 in order to focus the beam 20 to a point previously occupied by the end of fiber 34 shown in FIG. 4 of the drawing.

Subsequent exposure and development of photosensitive medium 13 in order to produce reflective holographic element 70 shown in FIG. 6 of the drawing is accomplished in the same manner described hereinabove with respect to the fabrication of holographic element 40.

Figure 6:
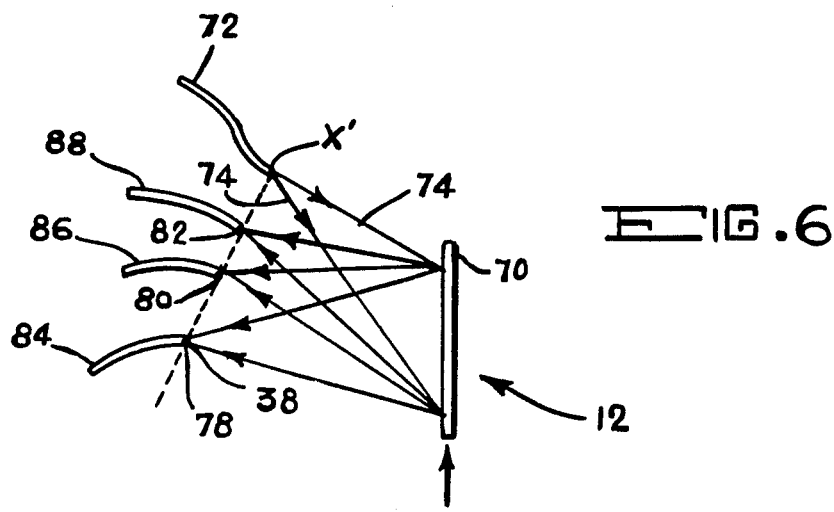
FIG. 6 is a schematic representation of the alternate embodiment of the multiplexer/demultiplexer of this invention, shown in operation.

Reference is now made to FIG. 6 of the drawing which illustrates the reflective multiplexer/demultiplexer 12 in its demultiplexer mode of operation in which its operation is virtually identical to the operation of transmissive multiplexer/demultiplexer 10 shown in FIG. 3 of the drawing. As is readily apparent from FIG. 6, reflective holographic element 70 provides for the wavelengths or channels which have been demultiplexed (output) to appear on the same side of holographic element 70 as the input fiber 72. In other words, a fiber 72 providing a plurality of wavelength-division multiplexed signals in the form of beam 74 would be positioned at the same point X' in space as occupied by the relative position with respect to photosensitive medium 13 as the end of fiber 34 shown in FIG. 4 and depicted as the point source X' in FIG. 5 of the drawing. As a result of the holographic technique utilized in the manufacture of this invention, each different wavelength channel is therefore reflected from holographic element 70 and focused to spots 78, 80 and 82 on the same side of holographic element 70 as the input optical fiber 72.

If desired, a plurality of optical fibers 84, 86 and 88 or detectors (not shown) may be utilized to receive the demultiplexed signals, respectively. In operation as a multiplexer, the procedure is reversed, in which individual beams each having a different wavelengths emerge from fibers 84, 86 and 88 and are reflected off holographic element 70 as a multiplexed signal received by optical fiber 72 or a conventional detector (not shown).

The reflective multiplexer/demultiplexer 12 shown in FIG. 6 of the drawing has two major advantages over the transmissive multiplexer/demultiplexer 10 shown in FIG. 3 of the drawing. First, it is more compact since the output beam is folded back and appears on the same side of the holographic element 70 as the input beam. Second, one fiber bundle only need be prepared and aligned including both the input and the several output fibers.

Although this invention has been described with reference to particular embodiment, it will be understood to those skilled in the art that this invention is also capable of a variety of further embodiments within the spirit and scope of the appended claims. For example, ideally, the wavelength in which the multiplexer/demultiplexers 10 and 12 of this invention would be fabricated, would be the center of the band at which the device would be used. Situations could arise, however, where this would not always be possible. It would then be desirable to use appropriate techniques to fabricate this invention at one wavelength for use at a different wavelength.

We claim:

1. A multiplexer/demultiplexer comprising: a holographic element made using a single exposure of a photosensitive medium; means located substantially at a first preselected point adjacent said holographic element for directing into or receiving from said holographic element a single beam of electromagnetic radiation having a plurality of different wavelengths; and means located at a plurality of positions substantially along a line extending through said first preselected point and a second preselected point adjacent said holographic element for receiving from or directing into said holographic element a plurality of beams of electromagnetic radiation, each of said beams being at a different wavelength, wherein the relationship between said holographic element, said first preselected point and said second preselected point is substantially the same as the relationship between a photosensitive medium, a point source of a diverging beam of temporally and spatially coherent electromagnetic radiation impinging upon said photosensitive medium and the focus point of a converging beam of temporally and spatially coherent electromagnetic radiation impinging upon said photosensitive medium during the exposure of said photosensitive medium in making said holographic element.

2. A multiplexer/demultiplexer as defined in claim 1 wherein said first preselected point and said second preselected point are located adjacent opposite sides of said holographic element.

3. A multiplexer/demultiplexer as defined in claim 1 wherein said first preselected point and said second preselected point are located adjacent the same side of said holographic element.

4. A multiplexer/demultiplexer as defined in claim 1 wherein said directing or receiving means at said first preselected point is an optical fiber.

5. A multiplexer/demultiplexer as defined in claim 1 wherein said directing or receiving means located along said line is in the form of a plurality of optical fibers, each of said fibers being located at each of said plurality of positions, respectively.

6. A multiplexer/demultiplexer as defined in claim 1 wherein said photosensitive medium is of sufficient thickness to achieve a substantially high diffraction efficiency and yet not have a substantially narrow bandwidth of operation, and the angular relationship between said diverging and said converging beams being such to produce low reflection losses while obtaining substantially high dispersion throughout an interference region therebetween.

7. A method of producing a multiplexer/demultiplexer comprising the following steps:
(a) producing a holographic element by:
 (i) impinging a diverging beam of temporally and spatially coherent electromagnetic radiation upon a previously unexposed photosensitive medium, said diverging beam emerging from a point source located adjacent said photosensitive medium,
 (ii) simultaneously impinging a converging beam of temporally and spatially coherent electromagnetic radiation upon said photosensitive medium in order to interfere with said diverging beam, said converging beam focusing to a preselected focusing point adjacent said photosensitive medium, and
 (iii) without further exposing said photosensitive medium to other beams, processing said photosensitive medium, thereby forming said holographic element,
(b) providing a directing or receiving means for a beam of electromagnetic radiation at a first preselected point adjacent said holographic element, said first preselected point having substantially the same relationship with respect to said holographic element as said point source had with respect to said photosensitive medium, and
(c) providing a plurality of receiving or directing means for a plurality of beams of electromagnetic radiation, respectively, substantially along a line extending through said first preselected point and a second preselected point adjacent said holographic element, said second preselected point having substantially the same relationship with respect to said holographic element as said focusing point had with respect to said photosensitive medium.

8. A method of producing a multiplexer/demultiplexer as described in claim 7 wherein said first preselected point and said second preselected point are located adjacent opposite sides of said holographic element.

9. A method of producing a multiplexer/demultiplexer as described in claim 9 wherein said first preselected point and said second preselected point are located adjacent the same side of said holographic element.

10. A method of demultiplexing a single beam of electromagnetic radiation having a plurality of different wavelengths comprising the steps of:
(a) directing said beam from a first preselected point adjacent a single component in the form of a holographic element made using a single exposure of a photosensitive medium so as to impinge upon said holographic element, and
(b) detecting a plurality of beams of electromagnetic radiation from said holographic element, each of said beams being at a different position adjacent said holographic element, said different positions being situated substantially along a line extending through said first preselected point and a second preselected point, and each of said beams at each of said positions being at a different one of said plurality of wavelengths,
wherein the relationship between said holographic element, said first preselected point and said second preselected point is substantially the same as the relationship between a photosensitive medium, a point source of a diverging beam of temporally and spatially coherent electromagnetic radiation impinging upon said photosensitive medium and the focus point of a converging beam of temporally and spatially coherent electromagnetic radiation impinging upon said photosensitive medium during the exposure of said photosensitive medium in making said holographic element.

11. A method of demultiplexing as defined in claim 10 wherein said first preselected point and said second preselected point are located adjacent opposite sides of said holographic element.

12. A method of demultiplexing as defined in claim 10 wherein said first preselected point and said second preselected point are located adjacent the same side of said holographic element.

13. A method of multiplexing a plurality of beams of electromagnetic radiation, each of said plurality of beams being at a different wavelength comprising the steps of:
(a) directing each of said plurality of beams from a different position adjacent a holographic element made using a single exposure of a photosensitive medium so as to impinge upon said holographic element, said different positions being situated substantially along a line extending through a first preselected point and a second preselected point, and
(b) detecting a single beam of electromagnetic radiation from said holographic element at said first preselected point adjacent said holographic element, said single beam having all of said different wavelengths,
wherein the relationship between said holographic element, said first preselected point and said second preselected point is substantially the same as the relationship between a photosensitive medium, a point source of a diverging beam of temporally and spatially coherent electromagnetic radiation impinging upon said photosensitive medium and the focus point of a converging beam of temporally and spatially coherent electromagnetic radiation impinging upon said photosensitive medium during the exposure of said photosensitive medium in making said holographic element.

14. A method of multiplexing defined in claim 13 wherein said first preselected point and said second preselected point are located adjacent opposite sides of said holographic element.

15. A method of multiplexing as defined in claim 13 wherein said first preselected point and said second preselected point are located adjacent the same side of said holographic element.

* * * * *